United States Patent
Wei et al.

(10) Patent No.: US 10,719,138 B2
(45) Date of Patent: Jul. 21, 2020

(54) INTERACTIVE ELECTRONIC APPARATUS AND INTERACTIVE METHOD THEREOF

(71) Applicants: Cheng-Yuan Wei, Taipei (TW); Kai-Yi Chen, Taipei (TW); Wen-Yi Chiu, Taipei (TW); Hsiu-Hang Lin, Taipei (TW); Sheng-Chieh Tang, Taipei (TW); Kun-Hsuan Chang, Taipei (TW)

(72) Inventors: Cheng-Yuan Wei, Taipei (TW); Kai-Yi Chen, Taipei (TW); Wen-Yi Chiu, Taipei (TW); Hsiu-Hang Lin, Taipei (TW); Sheng-Chieh Tang, Taipei (TW); Kun-Hsuan Chang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/391,319

(22) Filed: Apr. 23, 2019

(65) Prior Publication Data
US 2020/0103984 A1    Apr. 2, 2020

(30) Foreign Application Priority Data
Sep. 27, 2018    (TW) .............................. 107134196 A (51) Int. Cl.
| | | |
|---|---|---|
| G06F 3/03 | (2006.01) | |
| G06F 3/16 | (2006.01) | |
| G01V 7/06 | (2006.01) | |
| G06F 3/14 | (2006.01) | |
| A63H 33/26 | (2006.01) | |

(52) U.S. Cl.
CPC .................. *G06F 3/03* (2013.01); *G01V 7/06* (2013.01); *G06F 3/14* (2013.01); *G06F 3/16* (2013.01); *A63H 33/26* (2013.01); *A63H 2200/00* (2013.01)

(58) Field of Classification Search
CPC .... G06F 3/03; G06F 3/14; G06F 3/16; G01V 7/06; A63H 33/26; A63H 2200/00
See application file for complete search history.

(56) References Cited

FOREIGN PATENT DOCUMENTS

| TW | 201501766 | 1/2015 |
| TW | 201525770 | 7/2015 |
| TW | I496606 | 8/2015 |
| TW | 201539263 | 10/2015 |

OTHER PUBLICATIONS

"Office Action of Taiwan Counterpart Application," dated Dec. 24, 2019, p. 1-p. 11.

*Primary Examiner* — Charles V Hicks
(74) *Attorney, Agent, or Firm* — JCIPRNET (57) ABSTRACT

An interactive electronic apparatus and an interactive method thereof are provided. The interactive electronic apparatus includes a main device and a casing. The main device is installed in a containing space of the casing. After the main device establishes a connection with the casing, the casing sends at least one of a first distance between the casing and an object to be sensed by a first distance sensor and a second distance between a bottom portion of the casing and a plane detected by a second distance sensor to the main device. The main device determines an interactive state of interaction with the interactive electronic apparatus based on at least one of a movement information sensed by a gravity sensor, the first distance and the second distance, and sends an interactive signal corresponding to the interactive state.

20 Claims, 4 Drawing Sheets

INTERACTIVE ELECTRONIC APPARATUS AND INTERACTIVE METHOD THEREOF

CROSS-REFERENCE TO RELATED APPLICATION

This application claims the priority benefit of Taiwan application serial no. 107134196, filed on Sep. 27, 2018. The entirety of the above-mentioned patent application is hereby incorporated by reference herein and made a part of this specification.

BACKGROUND

Technical Field

The present disclosure relates to an electronic apparatus and a method thereof, particularly relates to an interactive electronic apparatus and an interactive method thereof.

Description of Related Art

With the development of technology, 3C electronic products have become popular, especially, smart electronic devices have almost become one of the necessary devices for families. In order to improve the convenience and practicability of the devices for users, smart electronic devices with different functions are constantly launched and upgraded. Among them, the toy industry has also developed rapidly under the fast paced development of electronic technology, sensor technology, computer technology, automatic control technology, artificial intelligence and mechanical technology. Therefore, how to create a favorable way of interaction between toys and a user has become an issue to work on.

SUMMARY

The present disclosure provides an interactive electronic apparatus and an interactive method, which may display different interactive interfaces according to different interactive states.

An interactive electronic apparatus of the present disclosure includes a main device and a casing. The casing has a containing space and the main device is installed in the containing space. The main device includes a first communication unit, a gravity sensor, and a first processor, wherein the first processor is coupled to the first communication unit and the gravity sensor, and the gravity sensor is configured to sense a movement information of the main device. The casing includes: a second communication unit, establishing a connection with the first communication unit; a first distance sensor, detecting a first distance between the casing and an object to be sensed; a second distance sensor, detecting a second distance between a bottom portion of the casing and a plane, wherein the plane is located on the opposite side of the bottom portion; and a second processor coupled to the second communication unit, the first distance sensor, and the second distance sensor. After the casing establishes the connection with the first communication unit of the main device through the second communication unit, the second processor transmits at least one of the first distance and the second distance to the first processor through the connection and the first processor determines an interactive state of interaction with the interactive electronic apparatus based on at least one of the movement information, the first distance, and the second distance, and the first processor sends an interactive signal corresponding to the interactive state.

In one embodiment of the present disclosure, after the casing establishes the connection with the first communication unit of the main device through the second communication unit, the first processor sends a starting signal, and the first processor determines whether the interactive state of interaction with the interactive electronic apparatus is detected within a preset period. If the interactive state of interaction with the interactive electronic apparatus is not detected by the first processor within the preset period, the first processor sends a standby signal, and when the standby signal has been sent, if the first distance is detected to be less than a first default value, the first processor determines the interactive state as an object-approaching state and sends the starting signal.

In one embodiment of the present disclosure, the starting signal includes at least one of a first video signal displayed on a display unit of the main device and a first audio signal generated by a speaker unit of the main device. The standby signal includes at least one of a second video signal displayed on the display unit of the main device and a second audio signal generated by the speaker unit of the main device.

In one embodiment of the present disclosure, if the second distance is detected to be greater than a second default value within the preset period, the first processor determines the interactive state as a lifted state and sends a lifted signal. When the lifted state is not detected by the first processor within the preset period, and the movement information is detected by the gravity sensor, the first processor determines the interactive state as a shaken state and sends a shaken signal.

In one embodiment of the present disclosure, the lifted signal includes at least one of a third video signal displayed on a display unit of the main device and a third audio signal generated by a speaker unit of the main device. The shaken signal includes at least one of a fourth video signal displayed on the display unit of the main device and a fourth audio signal generated by the speaker unit of the main device.

In one embodiment of the present disclosure, when the lifted signal has been sent, if the movement information is detected by the gravity sensor, the first processor sends a lifted-shaken signal. When the lifted signal has been sent, if the movement information is not detected by the gravity sensor, the first processor sends a lifted-still signal.

In one embodiment of the present disclosure, the lifted-shaken signal includes at least one of a fifth video signal displayed on a display unit of the main device and a fifth audio signal generated by a speaker unit of the main device; the lifted-still signal includes at least one of a sixth video signal displayed on the display unit of the main device and a sixth audio signal generated by the speaker unit of the main device.

In one embodiment of the present disclosure, the main device includes a display unit, the casing is a spherical component, the first distance sensor is disposed on a side of the spherical component on which the display unit is disposed, and the second distance sensor is disposed on the other side of the spherical component opposite to the side on which the display unit is disposed.

In one embodiment of the present disclosure, the casing further includes: a positioning module, transmitting a wireless positioning signal. When a controlling end device detects the wireless positioning signal, the controlling end device establishes a connection with the main device, and then the main device receives a controlling instruction or a pushing instruction transmitted by the controlling end device.

An interactive method of the present disclosure, including: providing an interactive electronic apparatus, the interactive electronic apparatus including a main device, a casing, a gravity sensor disposed in the main device, and a first distance sensor and a second distance sensor disposed in the casing, the main device installed in a containing space of the casing, the gravity sensor configured to sense a movement information of the main device, the first distance sensor configured to detect a first distance between the casing and an object to be sensed, the second distance sensor configured to detect a second distance between a bottom portion of the casing and a plane, wherein the plane is located on the opposite side of the bottom portion; the main device establishing a connection with a second communication unit of the casing through a first communication unit; after the main device establishing the connection with the casing, the casing transmitting at least one of the first distance and the second distance to the main device through the connection; the main device determining an interactive state of an interaction with the interactive electronic apparatus based on at least one of the movement information, the first distance, and the second distance, and sending an interactive signal corresponding to the interactive state.

A casing of an interactive electronic apparatus of the present disclosure is configured to be used with an external main device, the casing includes: a containing space, accommodating an external main device; a communication unit, establishing a connection with the external main device; a first distance sensor, detecting a first distance between the casing and an object to be sensed; a second distance sensor, detecting a second distance between a bottom portion of the casing and a plane, wherein the plane is located on an opposite side of the bottom portion; and a processor, coupled to the communication unit, the first distance sensor, and the second distance sensor. After the casing establishes the connection with the external main device through the communication unit, the processor transmits at least one of the first distance and the second distance to the external main device through the connection.

Based on the above, the present disclosure determines an interactive state of interaction with the interactive electronic apparatus through different sensors, and then displays the corresponding interactive interface on the interactive electronic apparatus.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
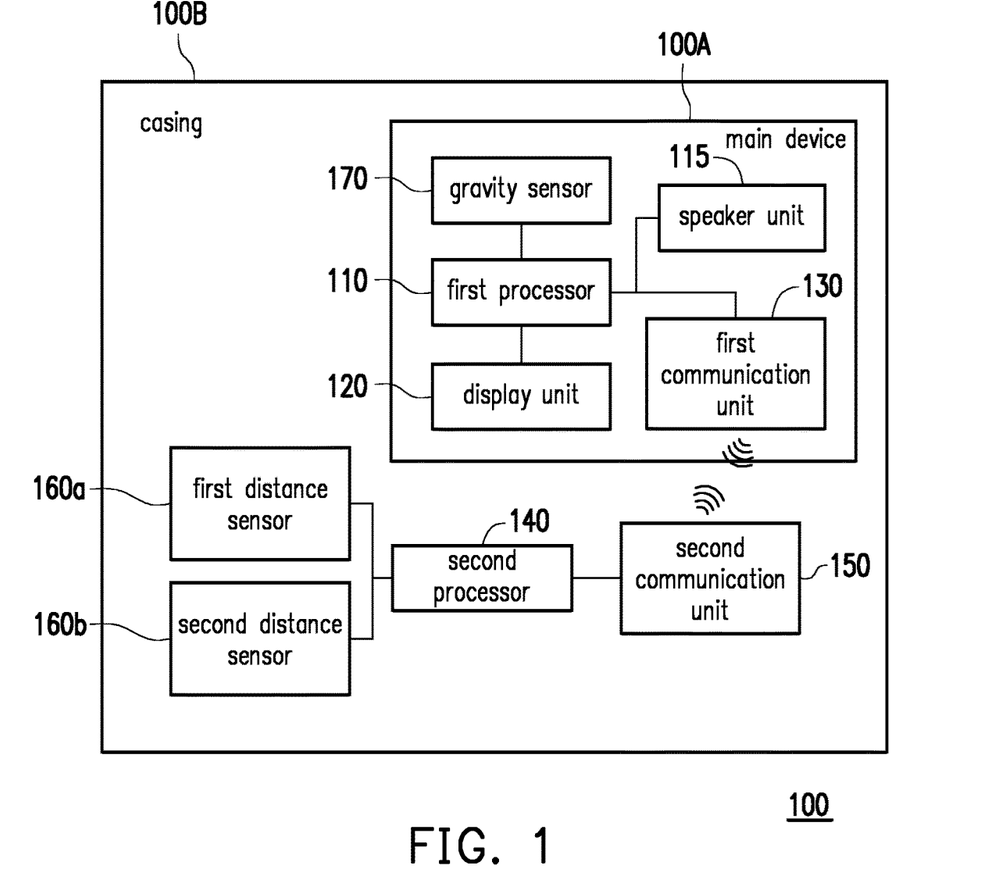
FIG. 1 is a block diagram of an interactive electronic apparatus according to an embodiment of the present disclosure.
Figure 2:
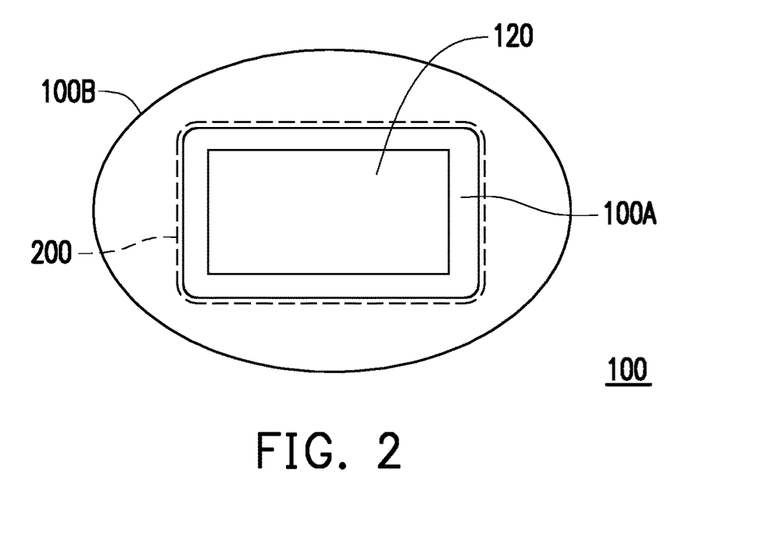
FIG. 2 is a schematic bottom view of an interactive electronic apparatus according to an embodiment of the present disclosure.
Figure 3:
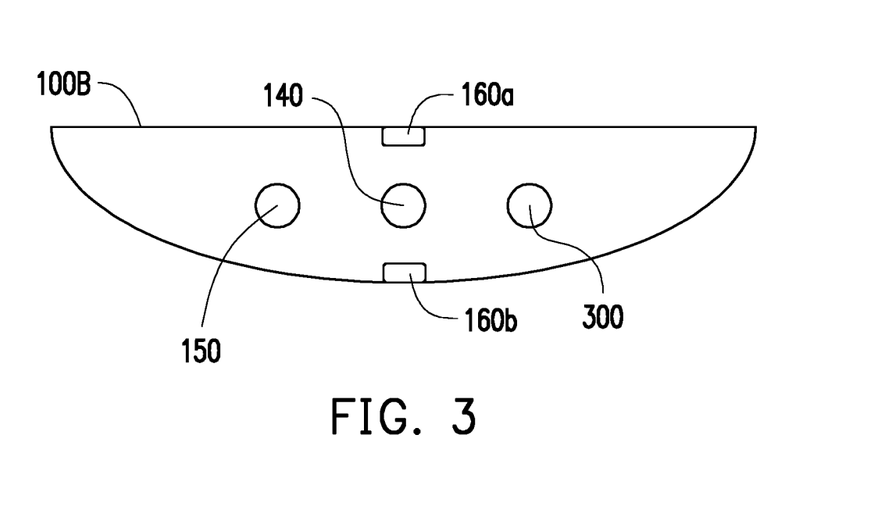
FIG. 3 is a schematic side view of an interactive electronic apparatus according to an embodiment of the present disclosure.

FIG. 1 is a block diagram of an interactive electronic apparatus according to an embodiment of the present disclosure. FIG. 2 is a schematic bottom view of an interactive electronic apparatus according to an embodiment of the present disclosure. FIG. 3 is a schematic side view of an interactive electronic apparatus according to an embodiment of the present disclosure.

Referring to FIG. 1 to FIG. 3, the interactive electronic apparatus 100 includes a main device 100A and a casing 100B. In this embodiment, the casing 100B has a containing space 200, and the main device 100A is detachably installed in the containing space 200, and the main device 100A can be, for example, a smart phone or a tablet. In other embodiments, the main device 100A can also be fixed to the casing 100B.

The main device 100A includes a first processor 110, a speaker unit 150, a display unit 120, a first communication unit 130, and a gravity sensor 170. The first processor 110 is coupled to the speaker unit 150, the display unit 120, the first communication unit 130, and the gravity sensor 170. A second processor 140, a second communication unit 150, a first distance sensor 160a, and a second distance sensor 160b are set inside the casing 100B. The second processor 140 is coupled to the second communication unit 150, the first distance sensor 160a, and the second distance sensor 160b. In other embodiments, a gravity sensor 170 can also be set in the casing 100B. A gravity sensor 170 is configured to sense a movement information of the main device 100A.

Herein, the casing 100B may be, for example, a semi-spherical component, and a first distance sensor 160a is disposed on a side of the casing 100B on which the display unit 120 is disposed, i.e. the plane side of the casing 100B, and the second distance sensor 160b is disposed on the other side of the casing 100B opposite to the side on which the display unit 120 is disposed. In other words, in this embodiment, the first distance sensor 160a is disposed adjacent to the containing space 200, and the second distance sensor 160b is disposed away from the containing space 200.

The first distance sensor 160a is configured to detect a first distance between the casing 100B and the object to be sensed, i.e., to detect whether an object to be sensed is approaching the casing 100B. For example, the first distance sensor 160a disposed on the casing 100A is used to detect whether someone is approaching the interactive electronic apparatus 100. The second distance sensor 160b is configured to detect a second distance between the bottom portion of the casing 100B and a plane (located on the opposite side of the bottom portion), i.e., whether the casing 100B is leaving the plane on which it was placed. For example, when the interactive electronic apparatus 100 is placed on the ground (the plane), the second distance sensor 160b disposed at the bottom portion of the casing 100B may be used to detect whether the casing 100B is leaving the ground, i.e., whether the interactive electronic apparatus 100 is lifted up.

In this embodiment, the casing 100B is a hard casing, however, in other embodiments, the casing 100B may also be a soft casing, for example: a cloth casing, a leather casing, a silicone casing or a rubber casing, or furry casing, which may increase closeness or preference for the casing 100B. In addition, the first distance sensor 160a may be an infrared sensor, an ultrasonic sensor or a near field sensor, and the second distance sensor 160b may be an infrared sensor, an ultrasonic sensor, an optical sensor or a pogo pin connector, but the present disclosure is not limited thereto.

In addition, the positioning module 300 may be further disposed inside the casing 100B. The positioning module 300 may adopt, for example, iBeacon protocol for transmitting wireless positioning signal. When a controlling end device (which is not shown in the drawings) detects a wireless positioning signal transmitted by the positioning module 300, the controlling end device establishes a connection with the first communication unit 130 of the main device 100A, then, the main device 100A receives controlling instructions or pushing instructions transmitted by the controlling end device, so as to make the first processor 110 perform the corresponding action. In other embodiments, the positioning module 300 may be a Bluetooth Low Energy module or a Wi-Fi Aware module, the Bluetooth Low Energy module may be, for example, an iBeacon module, a Gimbal module, or an Eddystone module, but the present disclosure is not limited thereto.

The first processor 110 and the second processor 140 may be implemented by a Central Processing Unit (CPU), a Graphic Processing Unit (GPU), a Physics Processing Unit (PPU), a programmable Microprocessor, an embedded control chip, a Digital Signal Processor (DSP), an Application Specific Integrated Circuits (ASIC) or other similar devices.

The first communication unit 130 and the second communication unit 150 may be, for example, chips or circuits that are compatible with wireless communication protocols such as Wi-Fi, Radio frequency (RF), and Bluetooth. The speaker unit 150 may be, for example, a loudspeaker such as an electrodynamic loudspeaker, an electromagnetic loudspeaker, a piezoelectric loudspeaker, an electrode speaker, or a plasma arc loudspeaker. The display unit 120 may be, for example, a Liquid Crystal Display (LCD), a Plasma Display, or the like.

Figure 4:
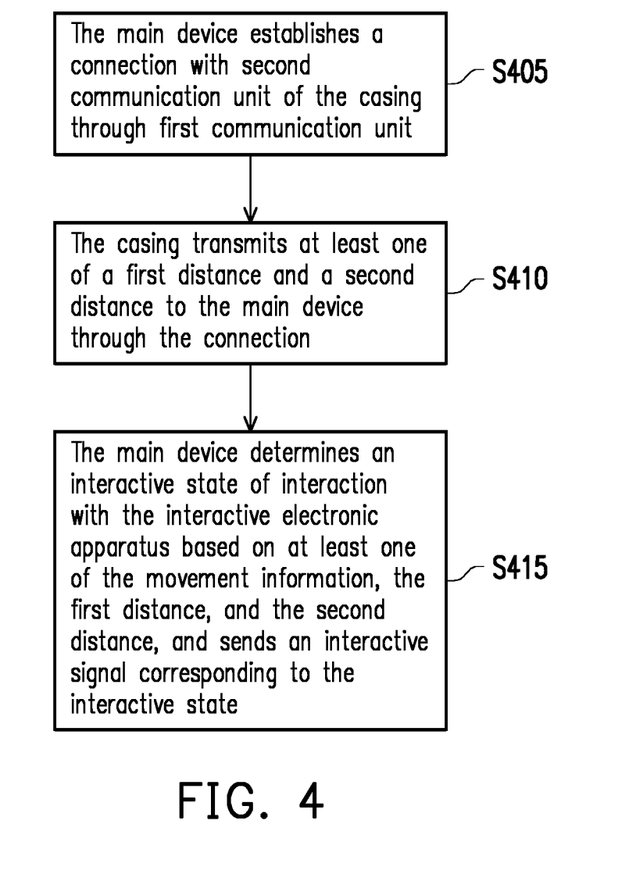
FIG. 4 is a flow chart of an interactive method according to an embodiment of the present disclosure.

The respective steps of the interactive method thereof are explained below with the interactive electronic apparatus 100. FIG. 4 is a flow chart of an interactive method according to an embodiment of the present disclosure. Refer to FIG. 1 to FIG. 4, in step S405, the main device 100A establishes a connection with the second communication unit 150 of the casing 100B through the first communication unit 130. For instance, the first communication unit 130 and the second communication unit 150 are Bluetooth modules, which establish a Bluetooth connection after Bluetooth pairing.

After the main device 100A establishes the connection with the casing 100B, in step S410, the casing 100B transmits at least one of a first distance and a second distance to the main device 100 through the connection. That is to say, the casing 100B may transmit the information detected by the first distance sensor 160a and the second distance sensor 160b to the first processor 110 of the main device 100A through the connection.

Afterwards, in step S415, the main device 100A determines an interactive state of interaction with the interactive electronic apparatus 100 based on at least one of the movement information, the first distance, and the second distance, and sends an interactive signal corresponding to the interactive state. The interactive signal includes at least one of a video signal and an audio signal. In this embodiment, the interactive state includes object-approaching state, lifted state, shaken state, etc. For example, determining whether it is an object-approaching state through the first distance sensed by the first distance sensor 160a, determining whether it is a lifted state through the second distance sensed by the second distance sensor 160b, determining whether it is a shaken state through the movement information sensed by the gravity sensor 170. Another example is provided below for further explanation.

Figure 5:
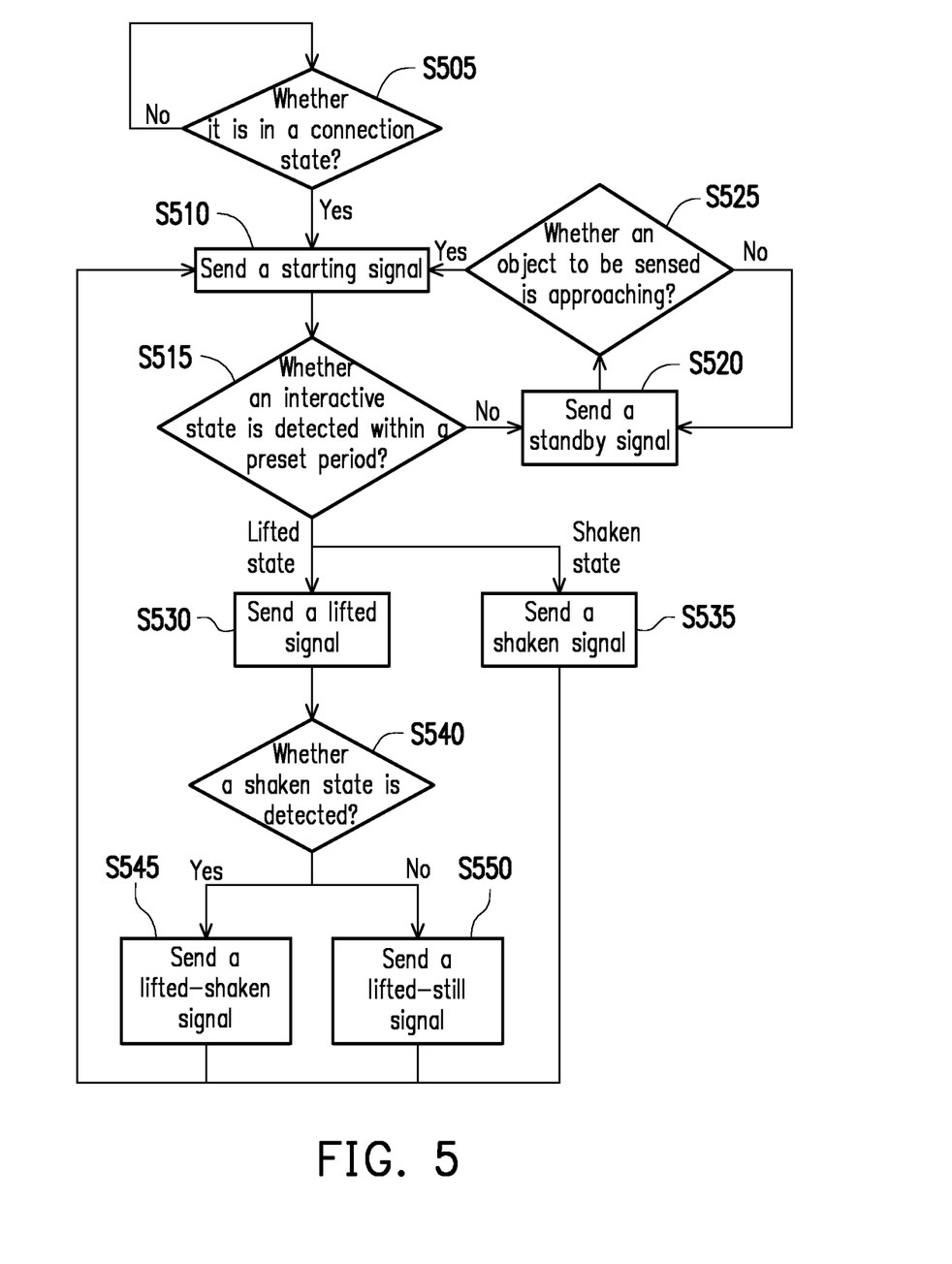
FIG. 5 is a flow chart of an interactive method according to another embodiment of the present disclosure.
Figure 6:
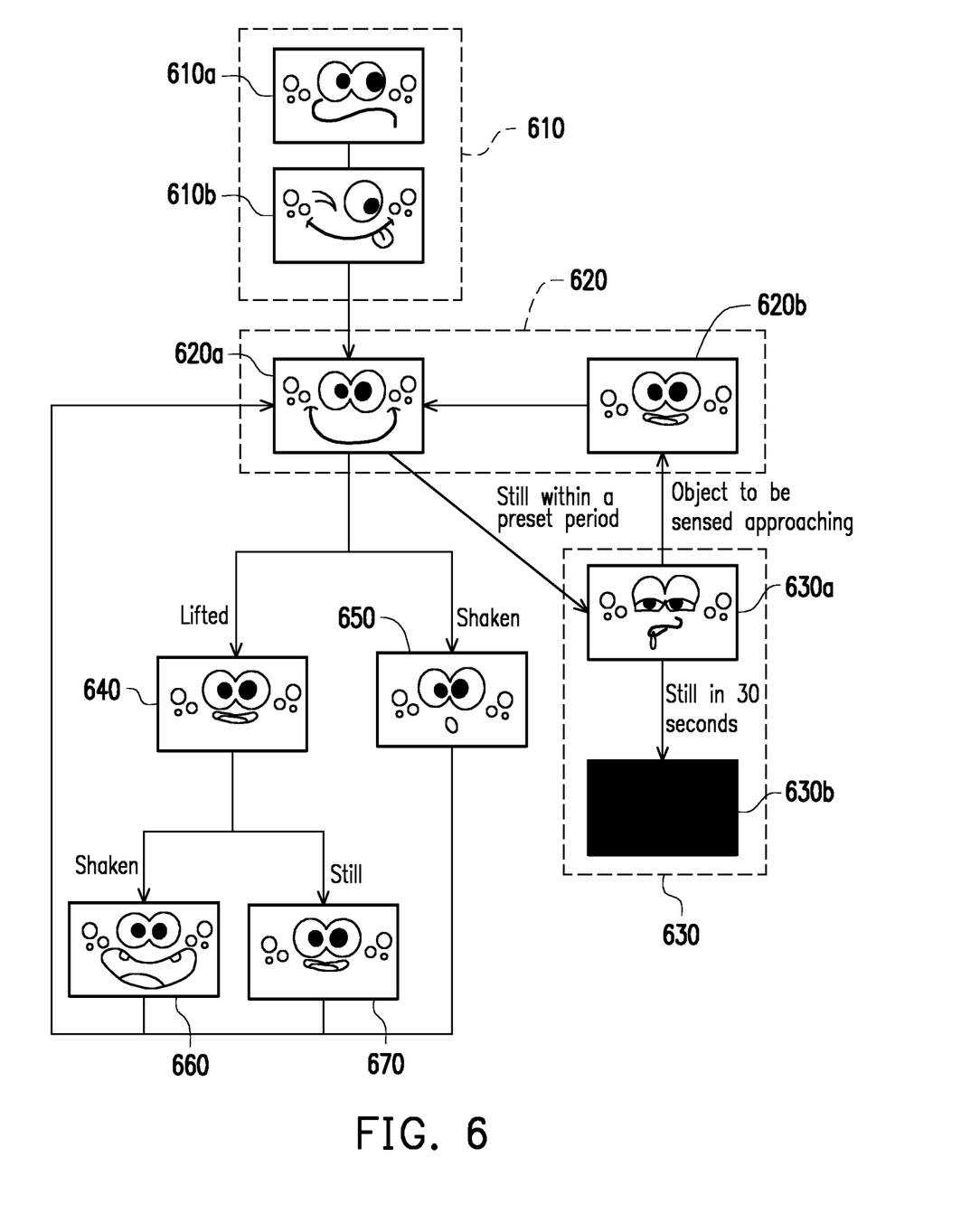
FIG. 6 is a schematic diagram illustrating switching of interactive interfaces according to an embodiment of the present disclosure.

FIG. 5 is a flow chart of an interactive method according to another embodiment of the present disclosure. FIG. 6 is a schematic diagram illustrating switching of interactive interfaces according to an embodiment of the present disclosure. Referring to FIG. 1 to FIG. 3, FIG. 5 and FIG. 6, in step S505, determining whether the interactive electronic apparatus 100 is connected. For example, as shown in FIG. 6, in the connecting phase, a connecting interface 610 is displayed on the display unit 120. Further, the connecting interface 610 includes an interactive interface 610a and an interactive interface 610b. When the first communication unit 130 and the second communication unit 150 are connecting, the interactive interface 610a is displayed; when the first communication unit 130 and the second communication unit 150 reach a connection, the interactive interface 610b is displayed.

Next, in step S510, the first processor 110 sends a starting signal. The starting signal includes at least one of a first video signal displayed on the display unit 120 of the main device 100A and a first audio signal generated by the speaker unit 150 of the main device 100A. Herein, the first video signal is the starting interface 620 shown in FIG. 6. The starting interface 620 includes an interactive interface 620a and an interactive interface 620b. Herein, the image of the interactive interface 620a presents a waiting, curious, smiling or blinking facial image with repeated blinking expressions, and the interactive interface 620b may play the first audio signal "Hello" for presentation simultaneously.

Afterwards, in step S515, the first processor 110 determines whether an interactive state of interaction with the interactive electronic apparatus 100 is detected within the preset period. When an interactive state of interaction with the interactive electronic apparatus 100 is not detected by the first processor 110 during the preset period, as shown in step S520, the first processor 110 sends a standby signal. The standby signal includes at least one of a second video signal displayed on the display unit 120 and a second audio signal generated by the speaker unit 150. Herein, the second video signal is the standby interface 630 shown in FIG. 6. The standby interface 630 includes an interactive interface 630a and an interactive interface 630b. The interactive interface 630a is presented with image showing tiredness or dozing, and the interactive interface 630b shows a black screen. Furthermore, the standby interface 630 may also play a snoring sound (a second audio signal) simultaneously. For example, if the interactive state of interaction with the interactive electronic apparatus 100 is not detected within a preset period (e.g., 10 seconds, but not limited thereto), the interactive interface 630a may be displayed, and if an interactive state is still not detected within another preset period (for example, 30 seconds, but not limited thereto), the interactive interface 630b may be displayed.

When the standby signal has been sent (displaying the standby interface 630), in step S525, the first processor 110 determines whether an object to be sensed is approaching. That is to say, the first processor 110 determines whether there is an object to be sensed approaching based on the first distance sensed by the first distance sensor 160a. Take an infrared sensor as an exemplification of the first distance sensor 160a, the second processor 140 converts the time of flight of the light detected by the first distance sensor 160a into a first distance, and then transmits the first distance to the first processor 110. The first processor 110 determines whether the first distance is less than a first default value. If the first distance is greater than or equal to first default value, determining that no object to be sensed is approaching the casing 100B. If the first distance is less than the first default value, indicating that an object to be sensed is approaching the casing 100B (the interactive electronic apparatus 100), determining the interactive state as an object-approaching state. When the standby interface 630 is displayed, only when an object to be sensed approaching the interactive electronic apparatus 100 is detected, the standby interface 630 may be closed and the step S510 is executed; if no object to be sensed approaching the interactive electronic apparatus 100 is detected, the standby interface 630 may be continuously displayed.

In step S515, determining whether the interactive state is a lifted state through the second distance sensor 160b. Take an infrared sensor as an exemplification of the second distance sensor 160b, the second processor 140 converts the time of flight of the light detected by the second distance sensor 160b into a second distance, and then transmits the second distance to the first processor 110. The first processor 110 determines whether the second distance is greater than a second default value (for example, 2 cm, but not limited thereto). If the second distance is not greater than the second default value, determining that the interactive electronic apparatus 100 is not lifted up. If the second distance is greater than the second default value, determining that the interactive electronic apparatus 100 is lifted (lifted state).

Furthermore, in step S515, it may determine whether the interactive state is a shaken state through the gravity sensor 170. For example, the gravity sensor 170 obtains the gravity units Gr, Gp on Roll and Pitch direction, respectively. The first processor 110 calculates the change ΔGr and ΔGp per unit time based on Gr and Gp, and then calculates the average change G based on ΔGr and ΔGp. If the average change G is greater than or equal to a threshold value, determining a shaken state; if the average change G is smaller than the threshold value, determining not shaken.

When the first processor 110 detects an interactive state as the lifted state (the second distance is greater than the second default value) in the preset period, step S530 is executed and sending a lifted signal. The lifted signal includes at least one of a third video signal displayed on the display unit 120 and a third audio signal generated by the speaker unit 150. Herein, the third video signal is the interactive interface 640 shown in FIG. 6. The interactive interface 640 is presented with a facial image showing excitement, flush, eyeball rotation or mouth opening and closing. When the interactive interface 640 is displayed, a sound of cheering or "Yahoo" (a third audio signal) may further be played simultaneously.

When the first processor 110 detects the interactive state as shaken state (the average change G is greater than or equal to the threshold value) in the preset period, executing step S535. In addition, when the first processor 110 detects an interactive state in the preset period, if the interactive state is the object-approaching state, the display unit 120 may still display the starting interface 620 since the starting interface 620 is currently displayed.

If the interactive state is not detected as the lifted state in the preset period, and a movement information is detected by the gravity sensor 170, in step S535, sending a shaken signal. The shaken signal includes at least one of a fourth video signal displayed on the display unit 120 and a fourth audio signal generated by the speaker unit 150. Herein, the fourth video signal is the interactive interface 650 shown in FIG. 6. The interactive interface 650 is presented with a facial image showing dizziness, cross-eyed eyes, large and small eyes, eyeball rotation or mouth inhalation. In addition, while the interactive interface 650 is displayed, the fourth audio signal may further be played simultaneously. For example, as the shaking amplitude becomes larger or the shaking time longer, playing "Oops", "Ouch", "Wow", "Oh NO", "Wai Yao", etc., or sounds showing surprising, powerless, annoying, resisting, or refusing, etc. After finishing the playing, switching the display scene on the display unit 120 into the interactive interface 620a of the starting interface 620.

When the interactive interface 640 corresponding to the lifted state (step S530) is displayed, in step S540, whether a shaken state is detected. If yes, step S545 is executed; if no, step S550 is executed. In step S545, sending a lifted-shaken signal. The lifted-shaken signal includes at least one of a fifth video signal displayed on the display unit 120 and a fifth audio signal generated by the speaker unit 115. Herein, the fifth video signal is the interactive interface 660 as shown in FIG. 6. When the interactive interface 640 corresponding to the lifted state is displayed, if a movement information is detected by the gravity sensor 170, displaying an interactive interface 660 corresponding to shaking under the lifted state on the display unit 170. The interactive interface 660 is presented with facial images showing itching, smirking, laughing, laughing-out-loud, eye-sluggish, eyeball-lifting, eyeball-rolling, mouth opening and closing, or mouth-lifting. In addition, a fifth audio signal may further be played. For example, as the shaking amplitude becomes larger or the shaking time longer, playing the sound such as, "hehe", "haha", "wow hahaha", or the like. After finishing the playing, switching the display scene on the display unit 120 into the interactive interface 620a of the starting interface 620.

When the interactive interface 640 corresponding to the lifted state is displayed, if the movement information is not detected by the gravity sensor 170, in step S550, sending a lifted-still signal. The lifted-still signal includes at least one of a sixth video signal displayed on the display unit 120 and a sixth audio signal generated by the speaker unit 150. Herein, the sixth video signal is the interactive interface 670 as shown in FIG. 6. The interactive interface 670 is presented with a facial image showing peace of mind, blinking, singing or mouth opening and closing. In addition, a sixth audio signal may further be played, for example, playing a singing voice. After finishing the playing, switching the display scene on the display unit 120 into the interactive interface 620a of the starting interface 620.

Furthermore, since a positioning module 300 is installed on the casing 100B, the positioning module 300 transmits a wireless positioning signal. When a parent with a smart phone (controlling end device) enters the range of the wireless positioning signal of the interactive electronic apparatus 100, the smart phone may establish a connection with the first communication unit 130 of the main device in the interactive electronic apparatus 100 through a built-in communication module (for example, a Bluetooth module), enabling parents to manipulate the interactive electronic apparatus 100 through their smartphones or tablets. In this embodiment, the main device 100A is, for example, a smart phone or a tablet, especially an old smart phone or tablet that the parents are about to discard, this may bring new life to old smartphones or tablets to reduce the production of electronic wastes.

In summary, the present disclosure determines an interactive state of interaction with the interactive electronic apparatus through different sensors, and then displays the corresponding interactive interface on the interactive electronic apparatus. Through the above embodiments, the children may interact with the interactive electronic apparatus on their own, or the parents may share contents such as movies or photos to the interactive electronic apparatus through their mobile phone. Therefore, the parents may control the content and usage time that the children can browse, so as to supervise the children's usage of the interactive electronic apparatus. In addition, since the content used by the interactive electronic apparatus comes from an external device, the interactive electronic apparatus itself can be manufactured in a lower cost manner, and consumers can purchase the device at a cheaper price.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An interactive electronic apparatus, comprising:
   a main device, comprising a first communication unit, a gravity sensor, and a first processor, wherein the first processor is coupled to the first communication unit and the gravity sensor, and the gravity sensor is configured to sense a movement information of the main device;
   a casing, having a containing space, the main device is installed in the containing space, the casing comprising:
      a second communication unit, establishing a connection with the first communication unit;
      a first distance sensor, detecting a first distance between the casing and an object to be sensed;
      a second distance sensor, detecting a second distance between a bottom portion of the casing and a plane, wherein the plane is located on an opposite side of the bottom portion;
      a second processor, coupled to the second communication unit, the first distance sensor, and the second distance sensor,
   wherein, after the casing establishes the connection with the first communication unit of the main device through the second communication unit, the second processor transmits at least one of the first distance and the second distance to the first processor through the connection and the first processor determines an interactive state of interaction with the interactive electronic apparatus based on at least one of the movement information, the first distance, and the second distance, and the first processor sends an interactive signal corresponding to the interactive state.

2. The interactive electronic apparatus as claimed in claim 1, wherein
   after the casing establishes the connection with the first communication unit of the main device through the second communication unit, the first processor sends a starting signal, and the first processor determines whether the interactive state of interaction with the interactive electronic apparatus is detected within a preset period,
   if the interactive state of interaction with the interactive electronic apparatus is not detected by the first processor within the preset period, the first processor sends a standby signal, and when the standby signal has been sent, if the first distance is detected to be less than a first default value, the first processor determines the interactive state as an object-approaching state and sends the starting signal.

3. The interactive electronic apparatus as claimed in claim 2, wherein the starting signal comprises at least one of a first video signal displayed on a display unit of the main device and a first audio signal generated by a speaker unit of the main device;
   the standby signal comprises at least one of a second video signal displayed on the display unit of the main device and a second audio signal generated by the speaker unit of the main device.

4. The interactive electronic apparatus as claimed in claim 2, wherein
   if the second distance is detected to be greater than a second default value within the preset period, the first processor determines the interactive state as a lifted state and sends a lifted signal;
   when the lifted state is not detected by the first processor within the preset period, and the movement information is detected by the gravity sensor, the first processor determines the interactive state as a shaken state and sends a shaken signal.

5. The interactive electronic apparatus as claimed in claim 4, wherein the lifted signal comprises at least one of a third video signal displayed on a display unit of the main device and a third audio signal generated by a speaker unit of the main device;
   the shaken signal comprises at least one of a fourth video signal displayed on the display unit of the main device and a fourth audio signal generated by the speaker unit of the main device.

6. The interactive electronic apparatus as claimed in claim 4, wherein
   when the lifted signal has been sent, if the movement information is detected by the gravity sensor, the first processor sends a lifted-shaken signal;
   when the lifted signal has been sent, if the movement information is not detected by the gravity sensor, the first processor sends a lifted-still signal.

7. The interactive electronic apparatus as claimed in claim 6, wherein the lifted-shaken signal comprises at least one of a fifth video signal displayed on a display unit of the main device and a fifth audio signal generated by a speaker unit of the main device;
   the lifted-still signal comprises at least one of a sixth video signal displayed on the display unit of the main device and a sixth audio signal generated by the speaker unit of the main device.

8. The interactive electronic apparatus as claimed in claim 1, wherein the main device comprises a display unit, the casing is a spherical component, the first distance sensor is disposed on a side of the spherical component on which the display unit is disposed, and the second distance sensor is disposed on the other side of the spherical component opposite to the side on which the display unit is disposed.

9. The interactive electronic apparatus as claimed in claim 1, wherein the casing further comprises:

a positioning module, transmitting a wireless positioning signal, wherein, when a controlling end device detects the wireless positioning signal, the controlling end device establishes a connection with the main device, and then the main device receives a controlling instruction or a pushing instruction transmitted by the controlling end device.

10. An interactive method, comprising:

providing an interactive electronic apparatus, the interactive electronic apparatus comprising a main device, a casing, a gravity sensor disposed in the main device, and a first distance sensor and a second distance sensor disposed in the casing, the main device installed in a containing space of the casing, the gravity sensor configured to sense a movement information of the main device, the first distance sensor configured to detect a first distance between the casing and an object to be sensed, the second distance sensor configured to detect a second distance between a bottom portion of the casing and a plane, wherein the plane is located on the opposite side of the bottom portion;

the main device establishing a connection with a second communication unit of the casing through a first communication unit;

after the main device establishing the connection with the casing, the casing transmitting at least one of the first distance and the second distance to the main device through the connection;

the main device determining an interactive state of an interaction with the interactive electronic apparatus based on at least one of the movement information, the first distance, and the second distance, and sending an interactive signal corresponding to the interactive state.

11. The interactive method as claimed in claim 10, after the main device establishing the connection with the casing, further comprising:

the main device sending a starting signal and determining whether the interactive state of the interaction with the interactive electronic apparatus is detected within a preset period;

if the interactive state of interaction with the interactive electronic apparatus is not detected within the preset period, the main device sending a standby signal;

when the standby signal has been sent, if the first distance is detected to be less than a first default value, the main device determining the interactive state as an object-approaching state and sending the starting signal.

12. The interactive method as claimed in claim 11, wherein the starting signal comprises at least one of a first video signal displayed on a display unit of the main device and a first audio signal generated by a speaker unit of the main device;

the standby signal comprises at least one of a second video signal displayed on the display unit of the main device and a second audio signal generated by the speaker unit of the main device.

13. The interactive method as claimed in claim 11, wherein after step of determining whether the interactive state of the interaction with the interactive electronic apparatus is detected within the preset period, further comprising:

when the second distance is detected to be greater than a second default value within the preset period, the main device determining the interactive state as a lifted state and sending a lifted signal;

when the lifted state is not detected within the preset period and the movement information is detected by the gravity sensor, the main device determining the interactive state as a shaken state and sending a shaken signal.

14. The interactive method as claimed in claim 13, wherein the lifted signal comprises at least one of a third video signal displayed on a display unit of the main device and a third audio signal generated by a speaker unit of the main device;

the shaken signal comprises at least one of a fourth video signal displayed on the display unit of the main device and a fourth audio signal generated by the speaker unit of the main device.

15. The interactive method as claimed in claim 13, wherein after the main device sending the lifted signal, further comprising:

determining whether the movement information is detected by the gravity sensor;

when the lifted signal has been sent, if the movement information is detected by the gravity sensor, the main device sending a lifted-shaken signal;

when the lifted signal has been sent, if the movement information is not detected by the gravity sensor, the main device sending a lifted-still signal.

16. The interactive method as claimed in claim 15, wherein the lifted-shaken signal comprises a fifth video signal displayed on a display unit of the main device and a fifth audio signal generated by a speaker unit of the main device;

the lifted-still signal comprises at least one of a sixth video signal displayed on the display unit of the main device and a sixth audio signal generated by the speaker unit of the main device.

17. The interactive method as claimed in claim 10, wherein the main device comprises a display unit, the first distance sensor disposed on a side of the casing on which the display unit is disposed, and the second distance sensor disposed on the other side of the casing opposite to the side on which the display unit is disposed.

18. The interactive method as claimed in claim 10, wherein the casing further comprises a positioning module, wherein the positioning module is configured to transmit a wireless positioning signal, and the interactive method further comprises:

providing a controlling end device; and when the controlling end device detects the wireless positioning signal, the controlling end device establishing a connection with the main device, and then the main device receiving a controlling instruction or a pushing instruction transmitted by the controlling end device.

19. A casing of an interactive electronic apparatus, configured to be used with an external main device, the casing comprising:

a containing space, accommodating an external main device;

a communication unit, establishing a connection with the external main device;

a first distance sensor, detecting a first distance between the casing and an object to be sensed;

a second distance sensor, detecting a second distance between a bottom portion of the casing and a plane, wherein the plane is located on an opposite side of the bottom portion; and a processor, coupled to the communication unit, the first distance sensor, and the second distance sensor wherein, after the casing establishes the connection with the external main device through the communication unit, the processor transmits at least one of the first distance and the second distance to the external main device through the connection.

20. The casing as claimed in claim 19, further comprising:
a gravity sensor, coupled to the processor for sensing a movement information of the external main device;
wherein after the casing establishes the connection with the external main device through the communication unit, the processor transmits the movement information to the external main device through the connection.

\* \* \* \* \*